Oct. 29, 1957  S. YERKOVICH  2,811,251
MEANS FOR HOLDING CASSETTES IN X-RAY SPOT FILM DEVICES
Filed Nov. 29, 1955  4 Sheets-Sheet 1

*INVENTOR.*
SIMON YERKOVICH
BY
Le Roy J. Leishman
ASSIGNEE

Oct. 29, 1957  S. YERKOVICH  2,811,251
MEANS FOR HOLDING CASSETTES IN X-RAY SPOT FILM DEVICES
Filed Nov. 29, 1955  4 Sheets-Sheet 2

INVENTOR.
SIMON YERKOVICH
BY
LeRoy J. Leishman
ASSIGNEE

Oct. 29, 1957  S. YERKOVICH  2,811,251
MEANS FOR HOLDING CASSETTES IN X-RAY SPOT FILM DEVICES
Filed Nov. 29, 1955  4 Sheets-Sheet 3

*INVENTOR.*
SIMON YERKOVICH
BY
Le Roy J. Leishman
ASSIGNEE

United States Patent Office 2,811,251
Patented Oct. 29, 1957

2,811,251

MEANS FOR HOLDING CASSETTES IN X-RAY SPOT FILM DEVICES

Simon Yerkovich, Los Angeles, Calif., assignor to Leroy J. Leishman, Los Angeles, Calif.

Application November 29, 1955, Serial No. 549,750

3 Claims. (Cl. 206—72)

The invention herein described pertains to means for yieldably holding an article within an enclosure or nest, and more particularly to yieldable means for holding X-ray cassettes in the movable carriages of so-called spot film devices or "tunnels" which are used for rapidly making radiographs of what a fluoroscopist sees on a fluoroscopic screen during the fluoroscopic examination of a patient.

In most spot film devices presently in use, the means employed for holding the cassettes in the movable carriages will not permit the use of cassettes of varying thicknesses. The retaining means are specifically designed for cassettes of given dimensions. One object of my invention is the provision of means that will retain cassettes of varying thicknesses within the cassette frame.

In many spot film devices currently in use, it is necessary to place either the lower edge or the left side of the cassette in the opening first, and then to push on the cassette near the opposite edge or side to snap it into the frame, where it is retained by yieldable means. One object of the present invention is to facilitate the insertion of the cassette by making it immaterial which side of the cassette is placed in the frame first.

A further object of my invention is the provision of such retaining means as will enable a rectangular cassette readily to be placed in the cassette frame in either a horizontal or vertical orientation.

An additional object of my invention is the provision of retaining means that may be constructed as independent and complete sub-assemblies that may be mounted in the corners of the cassette frame.

Another object is the provision of cassette retaining means that are simple to construct.

Another object is the provision of a durable structure.

Yet another object is the provision of retaining structures that may readily be replaced in the event of ultimate wear.

Still other objects will appear as the specification proceeds.

In the drawings:

Fig. 9 is a cross section taken on line 9—9 of Fig. 10 and it illustrates the manner in which the resilient material within the shell urges the two spaced retaining fingers outwardly without affecting the intervening retaining finger.

Fig. 10 is a side elevation of a combination constituting the second aforementioned embodiment of my invention.

Fig. 11 is a vertical section through an embodiment of the aforementioned second species, showing the limiting stop for the retaining fingers and the manner in which the retaining fingers are shaped for cooperation with this stop.

In the preferred embodiments of my invention, the cassette frame 1 is square and is either constructed of a flat sheet with four oppositely disposed side walls forming a tray, or of angle stock forming a square frame. The presently preferred size of film for spot film devices is 8" x 10" and the cassettes that hold films of this size are generally about 11$\frac{3}{32}$" x 9$\frac{3}{32}$". If the cassette frame is made so that the cassette will conveniently fit lengthwise therein, and if the cassette is symmetrically disposed so that the margins between the sides of the cassette and the sides of the frame are equal, these margins will each be 1" wide. If a cassette of the aforementioned dimensions is placed within the same square frame so that it is oriented with its long dimension horizontally disposed, and if the two inch difference between the width of the cassette and the inside width of the frame is arranged so that half of the difference will provide a top margin 1" wide, then the lower margin will also be 1" wide. This means that there will be an area in each corner 1" square in which no part of the cassette ever rests. My invention contemplates that the retaining means occupy these four corner areas.

In accordance with the foregoing considerations, I provide four generally cubical housings or shells 3, which are identical excepting for their ultimate orientation in the corners of the frame 1, and I provide for encasing or housing the various parts of my novel combinations within these identical shells.

Figure 6:
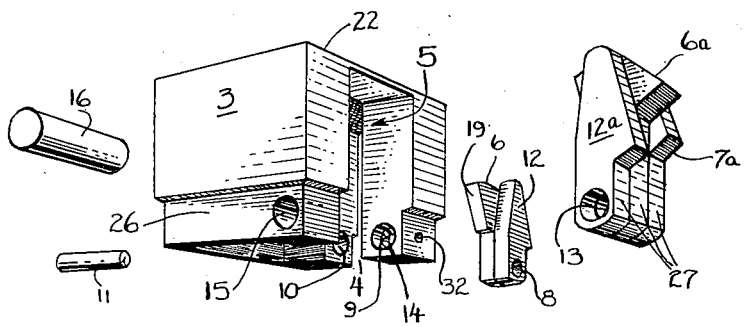
Fig. 6 is an exploded view of one of my retainer assemblies.
Figure 6:
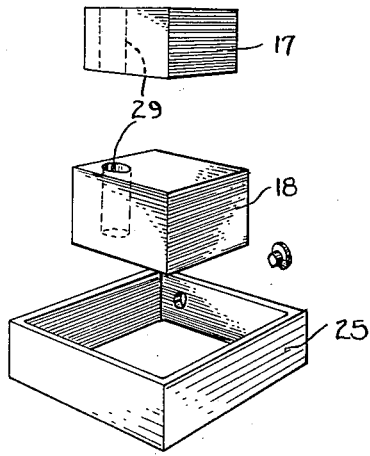
Figure 7:
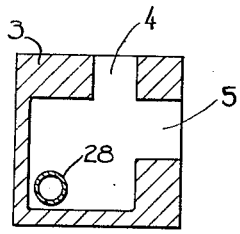
Fig. 7 is a cross section through the shell that houses various parts of my combination, this figure showing the recesses in the walls in which the retaining fingers are mounted.
Figure 8:
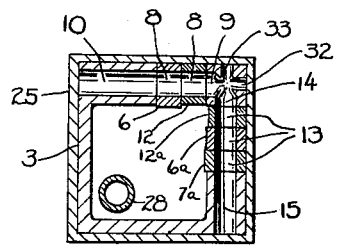
Fig. 8 is a cross section through the complete assembly taken on the plane of the axes of the pivotally mounted retaining fingers.

It will be observed in the cross-sectional view shown in Fig. 7 that the shell 3 is provided with two side openings 4 and 5. Opening 4 is adapted to receive two retainer fingers. In the species illustrated in Figs. 3 to 9, these fingers are identified by the reference numerals 6 and 12. Each of these retaining fingers has an aperture 8, Fig. 6, near the bottom end and extending therethrough. When the retaining fingers 6 and 12 are placed in the opening 4 in the shell or casing 3 during the initial assembly, the apertures or mounting holes 8 are placed in axial alignment with the holes 10, 9 and 32 in the housing. A pin 11, Fig. 6, is next inserted through the hole 10 in the casing and then through holes 8 in retaining fingers 6 and 12 and finally into aperture 9 in the other side of the casing. This arrangement pivots the retaining fingers on the pin 11. Aperture 32 is smaller than the diameter of pin 11 and is provided only so that something may be inserted therein to push pin 11 out during any disassembly that may subsequently be required.

Opening 5 in a wall of the casing adjoining that which is provided with opening 4, is adapted to receive three retaining fingers 6a, 7a and 12a, Figs. 4, 5, 6, 7 and 8. Fingers 6a and 12a are identical respectively to fingers 6 and 12. Fingers 6a, 7a and 12a are provided at their lower ends with individual apertures 13. During assembly, these last identified retaining fingers are so positioned within the aperture 5 that their apertures 13 are aligned with openings 14 and 16 in the shell; and a pin 16 is placed through the aperture 15, the three apertures 13 in retaining fingers 12a, 6a and 7a and then positioned in aperture 14 in the shell in order to pivot these last named fingers on a common axis. Another aperture 33, Fig. 8, axially aligned with apertures 14 and 15, is provided for disassembly purposes.

The space within the casing and behind the various retaining fingers is filled with a resilient material such as rubber, cork or neoprene. I prefer to use two blocks 17 and 18 of such resilient material, as indicated in the various figures. The upper resilient block 17 acts chiefly against the retaining fingers 6 and 6a which are provided for the retention of the thickest cassettes within the range of sizes for which the assembly is constructed. This block is narrower both ways than the lower block, and fingers 6 and 6a are accordingly each made to reach sufficiently further back than the other fingers to engage this upper resilient block. The longer reach for these fingers is achieved by providing them with a backwardly extending portion 19 near the top. This arrangement compensates for the difference in the length of the moment arms of the forces applied against the tips of the various retainers. If a single block of rubber or two blocks of rubber acted equally upon each of the three retaining fingers shown in Fig. 5, each finger would require a different degree of pressure upon its outwardly extending point to push it backward sufficiently far to permit the edge of the cassette to pass and be latched in place. These points are each at a different distance from the pivot and consequently present different moment arms to the forces pushing them back. Hence, if the same resilient block or blocks pressed equally on all three retaining fingers, the pressure required to depress retainer 6a would be less than for either of the other two retainers, because the moment arm is longer; and the pressure required on the point of retaining finger 12a would be the greatest, because the moment arm for such force is the shortest. The pressure of the lower block of rubber is exerted against all three retaining fingers, while the pressure of the upper block of resilient material is exerted mainly against the retaining fingers having the highest point against which pressure may be applied by the cassette. The longer moment arm afforded by retaining fingers 6 and 6a is thus compensated for by the fact that both blocks of rubber urge this member outwardly, whereas the upper resilient block 17 exerts very little or no pressure against the two fingers which present the shorter moment arms to the forces applied to their outwardly extending points.

Figure 9:
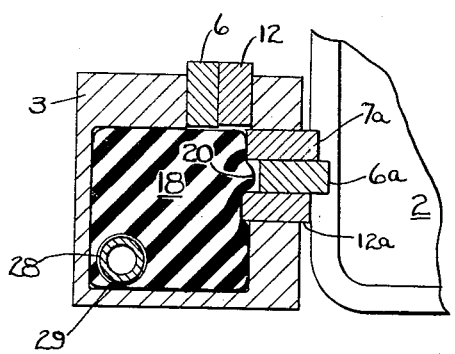
Figs. 9, 10 and 11 illustrate a second species of my invention, as well as certain structural and operational features that are common to both of the species described in this specification as illustrative embodiments of my invention. This is the species that I prefer.
Figure 10:
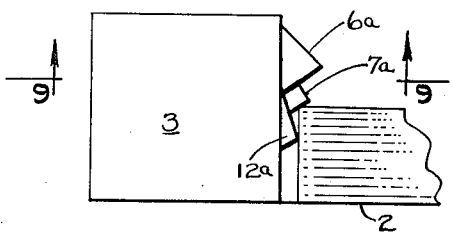

It will be noted that three retaining fingers are used on one side of the shell and finger assembly, whereas only two such fingers are provided on the other of the two sides where such fingers are located. On the side where three fingers are used, the finger 6a (which is the longest of the three somewhat differently shaped retaining fingers used in the embodiment herein described) is preferably placed between the other two. The reason for thus separating fingers 7a and 12a will be more readily understood if certain facts pertaining to these fingers are first set forth. Any cassette pressing retainer 7a inwardly of course presses finger 12a all the way back, because finger 12a has the lowest of the three projecting points, and consequently no part of it can overlap the top edge of any but the thinnest cassettes. This situation is illustrated in both Figs. 9 and 10, where finger 12a is shown completely depressed while finger 7a is depressed a lesser degree because of the fact that it is overlapping the top of the cassette 2. If these fingers were not separated, the depressed condition of the resilient material behind finger 12a would extend to a large degree to the material behind finger 7a, and the resilient material would thus not exert enough pressure upon the latter finger to enable it to hold the cassette in place. By spacing these fingers, however, the rubber is permitted to press outwardly somewhat at portion 20 between fingers 12a and 7a, as shown in Fig. 9, with the result that substantially maximum pressure is exerted against finger 7a notwithstanding the distorted condition of the block behind finger 12a as a result of the complete depression of this finger with the lowest projecting point. After a cassette that is to be retained in position by finger 7a has once passed the outwardly extending point of finger 6a during the insertion of such cassette, finger 6a again flips out to its outermost possible position, and it consequently exerts little, if any, pressure upon the lower block of resilient material 18.

Figure 1:
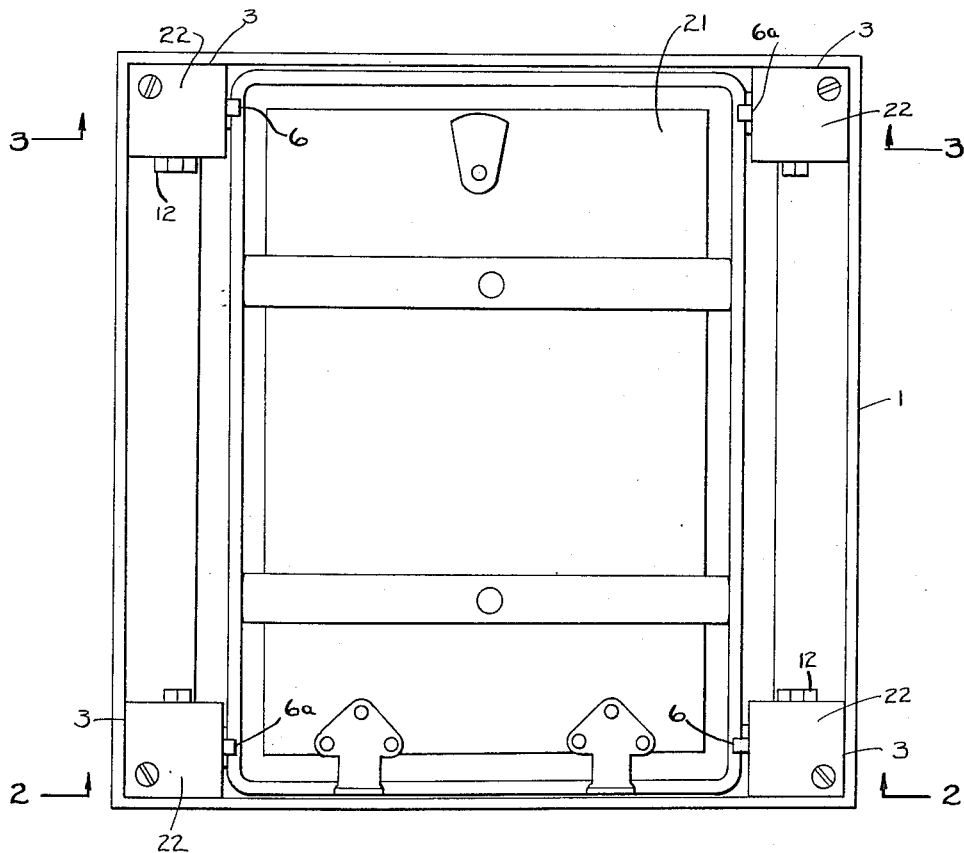
Fig. 1 is a plan view of a cassette frame equipped with retainers embodying my invention and holding a cassette in a vertical position within the frame.
Figure 2:
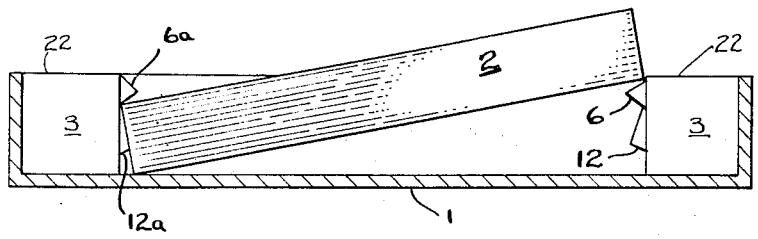
Fig. 2 is a section taken on line 2—2 of Fig. 1, but showing a cassette being placed in the frame for retention by the retainers.
Figure 3:
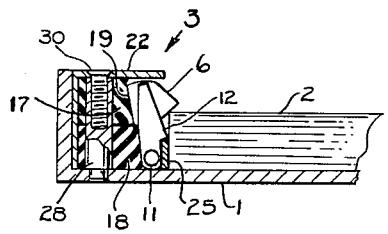
Fig. 3 is a section taken on line 3—3 of Fig. 1, the left half showing the co-action between a retainer finger and a relatively thick cassette and the right side showing the co-action between a retaining finger and a medium thickness cassette, or the high corner of a currently popular thin cassette whose other corners are low at the point of retention.
Figure 3:
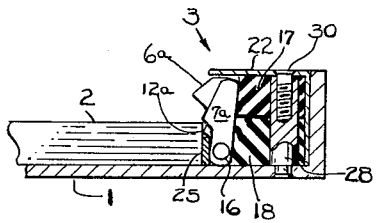
Figure 4:
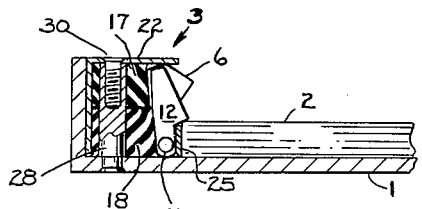
Fig. 4 is also a partial section taken on line 3—3 of Fig. 1, but showing the manner in which a relatively thin cassette is retained in the frame.
Figure 5:
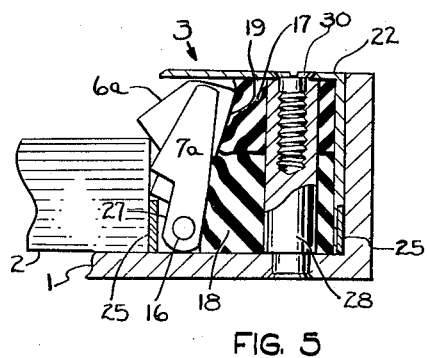
Fig. 5 is a partial section also taken substantially on line 3—3 of Fig. 1, showing the manner in which the resilient material behind the retaining fingers is compressed during the retention of a thick cassette.

There are some thin cassettes upon the market that have a thickness near one corner that is greater than the thickness of the cassette near the remaining three corners. In order to take care of such cassettes, the three retaining fingers previously referred to are arranged so that the retaining finger 7a, having an outwardly extending point at an intermediate distance from the pivot, will always be positioned where the cassette will lie. Thus, if it is assumed that corner 21, Fig. 1, is such high corner, the group of three fingers including the intermediate-acting finger 7a will be adjacent this corner and in a position to overlap the high portion of the low cassette. If the cassette is turned clockwise so that the cassette will be positioned horizontally in the frame 1 and with the high corner disposed in the lower right hand portion of the frame, another group of three fingers containing a centrally projecting finger 7a will be suitably located for co-action with such high corner. If the cassette is again oriented 90° clockwise to bring the cassette once more into a vertical orientation—this time with the thick corner 21 positioned in the lower left hand corner of the frame—the group of three retaining fingers including a centrally acting finger 12 will again be suitably disposed for co-action therewith. The only other possible position in which the cassette 2 may be placed in the frame is one in which the high corner 21 of the cassette will be in the upper left hand corner of the frame where another intermediate acting finger 7a is suitably disposed to overlap the thick corner of the cassette. It might be stated that these groups of three fingers are all on the counter-clockwise edge of the retainer assemblies, whereas the groups of two fingers are on the right hand or clockwise edge of these retainer assemblies.

For most cassettes currently in use, the fingers with the retaining points at the highest elevation are all that are required; and the lower of the two remaining fingers, represented by finger 12a, is all that is needed even for the thinnest of the currently popular cassettes, except for the thick corner thereof, and it is for this corner that I have provided finger 7a, having a pressure point of intermediate elevation.

Figure 11:
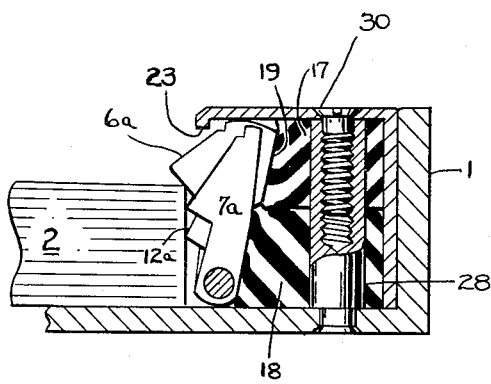
Figure 12:
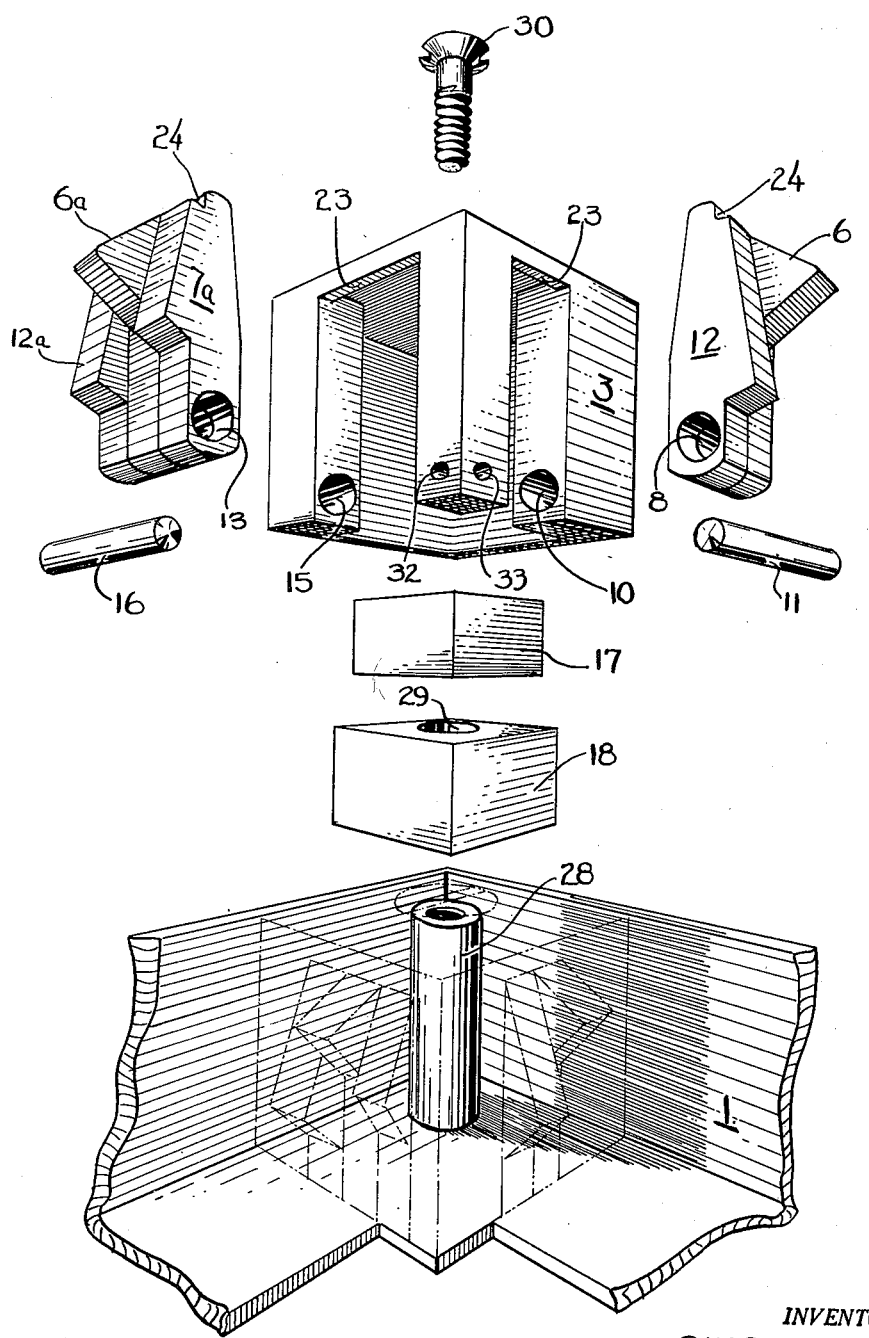
Fig. 12 is an exploded view of the second aforementioned embodiment of my invention.

The shells or casings 3 each have a top side or cover 22, as indicated in several of the illustrations. This cover serves four functions: first, it strengthens the shell or housing; second, it protects the various parts against dirt; third, it improves the appearance of the assembly; and fourth, in the embodiment of my invention, shown in Figs. 9 to 12, it affords a convenient means to provide a lip or abutment 23, Figs. 11 and 12, for limiting the outward movement of the fingers. It will be noted in these figures that each of the fingers is notched at the upper outer corner in order to present an outwardly facing shoulder 24 for engagement with the abutment 23 to limit the outward movement of these fingers.

In the embodiment illustrated in Figs. 3 to 8, the outward movement of the fingers is limited by the rectangular band 25 which fits over the reduced portion 26, Fig. 6, of the shell or housing 3. It will be clear that the fingers in this embodiment, when assembled, will not be able to move further outward than the engagement of surfaces 27 of these fingers with the inner wall of band 25 will permit.

Each corner of the cassette frame is provided with a post 28 suitably riveted or screwed into place, as indicated in the figures. The resilient blocks each have apertures 29 therein through which the corner posts 28 extend when the complete assemblies are placed in position in the corners of the cassette frame. The top ends of the posts 28 are threaded, and the top portion 22 of each of the assemblies is provided with a countersunk hole that registers with a threaded hole in the corner post so that a flat head screw 30 may be inserted through the aperture in the top plate and screwed into the post 28 in order to hold the assembly in place.

It will be clear that many embodiments of my invention, other than those illustrated, may be constructed by those skilled in the art without departing from the broad principles of my invention as set forth in the appended claims. Furthermore, various parts may be combined or divided, or omitted and replaced by other parts performing their same functions.

My claims are:

1. A combination for releasably retaining an elongated rectangular object within a relatively square enclosure with the longitudinal axis of said object parallel to either pair of the opposite sides of said enclosure, said combination including: a plurality of assemblies each of which is located in one corner of said enclosure, each of said assemblies comprising a generally hollow casing having two adjacent sides disposed parallel to the respectively opposite sides of the enclosure, each of said sides having an opening therein; at least one elongated latching member disposed generally vertically within each of said openings and pivotally mounted in said casing near the bottom of said enclosure on an axis parallel to said bottom, the outer edge of said member inclining outwardly from the top thereof and then inwardly to form two sloping surfaces; an abutment on said casing for limiting the angular movement of said member in an outward direction; and resilient means within said casing for urging said member outwardly against said abutment; the upper of said sloping surfaces acting to cam said member away from said abutment when engaged by said object during its insertion within said enclosure, and the lower of said surfaces acting to partially overlap the upper portion of said object to yieldably hold the object in said enclosure under the pressure of said resilient means.

2. A combination for releasably retaining an elongated rectangular object within a relatively square enclosure with the longitudinal axis of said object parallel to either pair of the opposite sides of said enclosure, said combination including: a plurality of assemblies each of which is located in one corner of said enclosure, each of said assemblies comprising a generally hollow casing having two adjacent sides disposed parallel to the respectively opposite sides of the enclosure, each of said sides having an opening therein; at least one elongated latching member disposed generally vertically within each of said openings and pivotally mounted in said casing near the bottom of said enclosure on an axis parallel to said bottom, the outer edge of said member inclining outwardly from the top thereof and then inwardly to form two sloping surfaces; an abutment on said casing for limiting the angular movement of said member in an outward direction; and a rubber-like block within said casing for urging said member outwardly against said abutment; the upper of said sloping surfaces acting to cam said member away from said abutment when engaged by said object during its insertion within said enclosure, and the lower of said surfaces acting to partially overlap the upper portion of said object to yieldably hold the object in said enclosure under the pressure of said rubber-like block.

3. A combination for releasably retaining wafers of different thicknesses within an enclosure, said combination including: a plurality of assemblies spaced around said enclosure, each of said assemblies comprising a generally hollow casing having an opening in at least one side thereof; a plurality of elongated latching members disposed generally vertically within said opening and pivotally mounted in said casing near the bottom of said enclosure on an axis parallel to said bottom, the outer edge of each of said members inclining outwardly from the top thereof and then inwardly to form two sloping surfaces, the distance between the top of each member to the juncture of its said surfaces being different for each member; an abutment on said casing for limiting the angular movement of said members in an outward direction; and resilient means within said casing for urging said members outwardly against said abutment; the upper sloping surface of each member acting to cam said member away from said abutment when engaged by a wafer during its insertion within said enclosure, and the lower sloping surface of at least one of said members acting to partially overlap the upper portion of said wafer to yieldably hold the wafer in said enclosure under the pressure of said resilient means.

References Cited in the file of this patent

UNITED STATES PATENTS

| | | |
|---|---|---|
| 666,106 | Matthias | Jan. 15, 1901 |
| 1,356,453 | Kennard | Oct. 19, 1920 |
| 2,516,124 | Kishibay | July 25, 1950 |
| 2,588,732 | Kemp | Mar. 11, 1952 |

FOREIGN PATENTS

| | | |
|---|---|---|
| 290,807 | Great Britain | May 24, 1928 |